Feb. 25, 1969   J. P. LONGWELL ET AL   3,429,265
SOLID PROPELLANT SYSTEM FOR ROCKETS
Filed Dec. 30, 1960
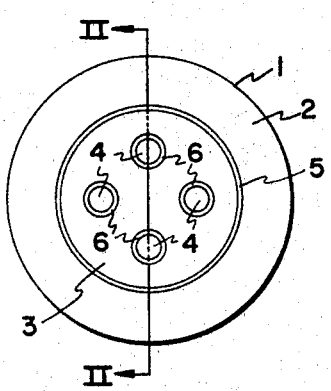
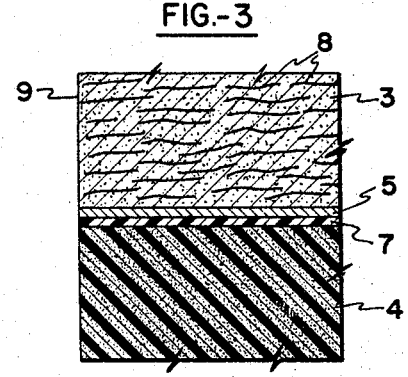
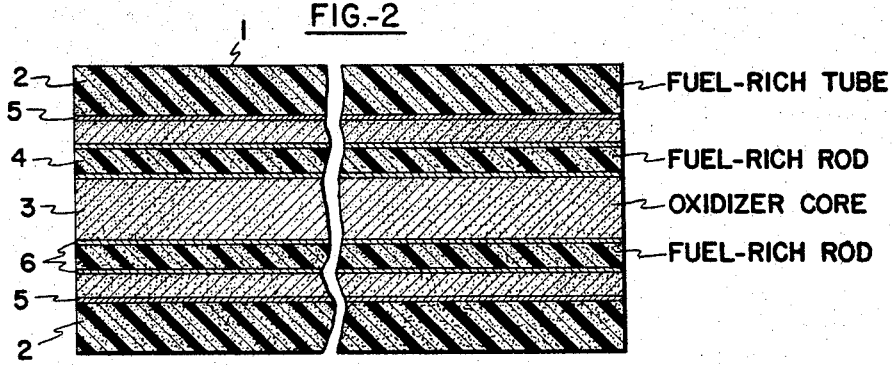
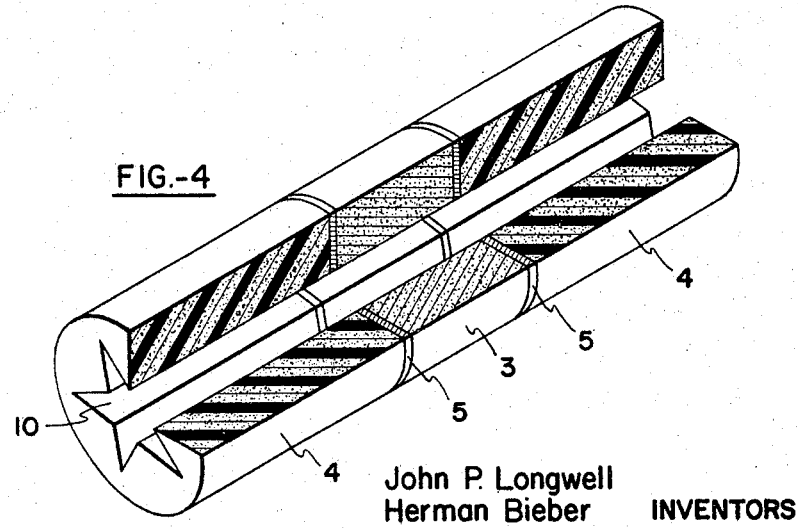
John P. Longwell
Herman Bieber   INVENTORS
John W. Begley
BY *Henry Besk* PATENT ATTORNEY

United States Patent Office

3,429,265
Patented Feb. 25, 1969

3,429,265
SOLID PROPELLANT SYSTEM FOR ROCKETS
John P. Longwell, Westfield, and Herman Bieber, Kenilworth, N.J., and John W. Begley, Bartlesville, Okla., assignors to Esso Research and Engineering Company, a corporation of Delaware
Filed Dec. 30, 1960, Ser. No. 79,916
U.S. Cl. 102—101   6 Claims
Int. Cl. C06b 11/00, 15/00; F42b 1/00

This invention is related to a rocket propellant system having a solid oxidizer-rich mass and adjacent solid fuel-rich mass in a grain without contact between these different kinds of masses.

This invention is concerned with the problem of using a solid-oxidizer-rich substance that is highly reactive with the solid fuel-rich substance in the same grain, e.g. solid nitronium perchlorate (NPC) as oxidizer and solid hydrazine diborane (HDB) as fuel. It is also concerned with using a minimal amount of low energy material, such as hydrocarbon binder or other materials that tend to lower the energy value.

It has now been found possible to make a new kind of high density grain structure that is stable before ignition and that has a controlled burning rate by a gross or macroencapsulation of the different components, i.e. oxidizer-rich and fuel-rich so that they are separated by a thin wall of material that is inert to (i.e. compatible with) these components under ordinary conditions. An example of such a thin wall is a metal of low permeability, e.g. aluminum foil.

A small amount of plastic fuel substance which serves as binder or cement can be used to hold the grain and the thin metal separators in place. The binder materials can include rubbery polymers compatible with the high energy solid fuel-rich or oxidizer-rich components they contact. Binder materials, such as polyethylene, may be used.

A number of geometric designs can be made of the grain that contains the different propellant components, but a preferred embodiment is a grain of cylindrical contour that fits into the inner cylindrical wall of a combustion chamber in a rocket so that the grain and rocket casing are coaxial with respect to the longitudinal axis of each.

In the drawing is illustrated a preferred embodiment of such a grain containing two kinds of propellant components arranged for end-burning.

FIG. 1 shows the front view of the grain at its burning or igniting end.

FIG. 2 shows a cross-section along the longitudinal axis of the grain at II—II.

FIG. 3 shows an enlarged view of a broken-away portion parallel to the longitudinal axis of the grain to show the burning or igniting end surface and the arrangement of two different solid fuel and oxidizer-rich components separated by a thin wall.

FIG. 4 is an isometric view in quarter section of a grain consisting of adjacent gross encapsulated discs having a central perforation.

In FIG. 1 the cylindrical grain of which the outer surface 1 fits into a cylindrical casing of a rocket combustion chamber has an outer annulus 2 of a tubular fuel-rich solid, hydrazine diborane, $N_2H_4 \cdot B_2H_6$, and an inner cylindrical core 3 of oxidizer solid, nitronium perchlorate, $NO_2ClO_4$. The core may contain rods, 4, of the hydrazine diborane running longitudinally through the grain and so spaced that the fuel and oxidizer burn at the same rate progressively from the igniting end surface.

The adjacent surfaces of the annulus 2, core 3, and rods 4, which would otherwise be interfaces between the two different solid components are separated by in-between thin metal wall and/or thin plastic jackets 5 and 6.

In the enlarged cut-away view of FIG. 2 the thin metal wall 5 is shown separating adjacent solid hydrazine diborane in annulus 2 from the solid nitronium perchlorate in central core 3 to protect against premature reaction. This separating wall 5 may be a thin plastic, e.g. or have a lining 7 of such plastic (FIG. 3). The same kind of wall arrangement may be used for separating the solid rods 4 from the solid core 3.

Additionally, the burning rate of the separate propellant components may be controlled by appropriate choice of the jacket-wall material according to its thermal conductivity and by the use of auxiliary heat conducting metal wires 8 normal or perpendicular to the end burning surface 9.

By the arrangement, cross-sectional area and number of the internal rods 4 of hydrazine diborane, there is a further control of the burning rate because heat from reaction of the hydrazine diborane is supplied for decomposition of the nitronium perchlorate.

The metal used for the thin walls 5 and 6 of the jackets separating the propellant solids which are incompatible with each other can be a metal which itself is a fuel component, e.g. aluminum, magnesium, beryllium or boron.

In another embodiment of this concept, an internal burning grain may be made by stacking alternate discs, say of NPC and HDB, separated by metal or plastic washers. This grain could then have a star shaped or other suitable core to give any desired thrust program. This embodiment is shown in FIG. 4 in which the solid fuel-rich disc 4 of HDB is separated from the adjacent solid oxidizer-rich disc 3 of NPC by thin metal foil washers 5. The perforation 10 is central to the discs and washers.

Example 1

In an example of the grain described, the hydrazine diborane being 45 parts by weight to 55 parts by weight of the nitronium perchlorate, a specific impulse (Isp) realizable from the use of these components is 300 seconds (pounds thrust/second/pound of propellant).

The principles outlined on gross or macro-encapsulation of the separate kinds of solid propellant components, one being a fuel-rich solid and the other an oxidizer-rich solid phase is beneficial in use of various substances that need the protective separation as in the following examples in which proportions by percent wt. are given:

Example 2

Fuel-rich phase:                                   Percent
   (a) $C_4H_6(NF_2)_4$ ------------------------ 54.2
   (b) B ---------------------------------------- 1.5
   (c) $[C_4H_6(NF_2)_2]$ ----------------------- 15.0

Oxidizer-rich phase:
   $NO_2ClO_4$ 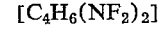 ----------- 29.3

In the fuel-rich phase, the solid butadiene polymer adduct (c) containing the recurring unit $$[C_4H_6(NF_2)_2]$$

is plasticized by the tetrakis (difluoramino) butane (a) and contains powdered boron (b).

The Isp of this system in which the nitronium perchlorate is grossly encapsulated is 293.

Example 3

Fuel-rich phase: percent
- (a) $N_2H_4(BH_3)_2$ -------- 21.5
- (b) $(CH_2)_x$ -------- 5.4

Oxidizer-rich phase:
- $NO_2ClO_4$ -------- 73.1

In this system, the hydrazine diborane (a) is mixed with a small amount of binder (b) for molding. The Isp of this system with the nitronium perchlorate encapsulated for separation in the grain is 293.

Example 4

Fuel-rich phase: percent
- (a) $C_6(NF_2)_6$ -------- 66.6
- (b) $[CH(NF_2)]_x$ -------- 6.0

Oxidizer-rich phase:
- $C_2(NO_2)_6$ -------- 19.5

"Driving fluid" phase:
- $N_2H_4(BH_3)_2$ -------- 8.9

In this system there are three separated solid phases. A solid mixture of hexakis (difluoroamino) hexane and $NF_2$-polymer (b) is one phase. The hydrazine diborane is a separate driving phase. The oxidizer-rich solid hexanitroethane is separately encapsulated. The Isp of this system is 302.

Other super-reactive solid fuels oxidizable by the incompatible oxidizers are metal hydrides, e.g. $LiAlH_4$, $B_{10}H_{14}$, $AlH_3$, $MgH_2$ and $BeH_2$.

Other highly reactive oxidizers are $N_2H_5C(NO_2)_3$, $[C(NO_2)_3CH_2]_2NNO_2$, i.e., nitroformates, nitrates, perchlorates, nitramines, etc.

Any of such super-reactive fuels and any of such super-reactive oxidizers can be chosen for the making of the grains in which these components are gross encapsulated for separation to protect against premature ignition by contact but arranged as adjacent parts of the grain for controlled burning.

Nitronium perchlorate is an example of a high energy oxidizer that can give best results provided it can be kept segregated from a high energy fuel such as hydrazine diborane. In the present instance, gross encapsulation of such an oxidizer means that the oxidizer is contained in a thin-walled metal and/or plastic cylinder. The metal may be in the form of a deposited coating or fabricated tube having a wall thickness of about 0.0003 to 0.5 millimeter. The solid mass encapsulated has to have a sufficient thickness for structural strength in the shaping or forming of the mass, e.g. at least about 1 cm.

The stabilized solid propellant grains described have particular merit in using a solid fuel having a high hydrogen content, e.g. metal hydrides (including hydrides of boron) as a mass separated from an adjacent mass of a solid oxidizer that is incompatible with such a fuel. Such fuel and oxidizer cannot be intimately mixed. Contact of such fuel with the oxidizer causes rapid undesired reaction. However, by using a thin wall of metal and/or polymer which can resist breakdown by the oxidizer, a good protective barrier is maintained between the mass of solid fuel and the mass of solid oxidizer.

By having each solid mass of fuel separated from each solid mass of oxidizer by the thin wall of compatible material extending as a tube or disc through the grain containing an arrangement of said masses, the problem of separation and of forming the entire grain is simplified, regardless of whether the forming is obtained by casting, molding, or extruding.

With the arrangement of each fuel mass and oxidizer mass contained between separating thin walls, each of these masses burns separately with uniform velocity in a direction perpendicular to the ignited surface (end or surface bounding the perforation). The burning surface of each wall enclosed mass is perpendicular to the wall of the mass. Thus, each fuel mass and each oxidizer mass has a predetermined burning surface area defined by the partitioning thin walls. With this mode of controlled burning, the encapsulated solid oxidizer phase, requiring addition of heat to make it undergo smooth burning, is embedded in a surrounding mass of the faster reacting fuel so as to provide the amount of heat transfer area required.

When the grain is ignited at its exposed surface, at the end of the solid grain or at the surface boundary of the perforation the hydrazine diborane fuel mass starts to burn more readily but in a short time heat from the burning hydrazine diborane starts to vaporize the nitronium perchlorate at its surface, then the mixed gases and vapors of fuel and oxidizer undergo combustion which supplies heat for further burning.

A useful expedient for promoting burning of nitronium perchlorate of large mass involves distribution in critical small amount of compatible hydrocarbonaceous material in the mass, e.g. in the range of about 1 to 5 wt. percent polyethylene. This is described and claimed in U.S. application Ser. No. 79,946, filed Dec. 29, 1960, now Patent No. 3,373,063, by Chludzinski, Bieber, and Spenadel. This expedient may be used with the grain design of the present invention for assisting in the controlled burning of the solid oxidizer at a rate comparable to that of the solid fuel.

What is claimed is:

1. A stabilized solid propellant grain having a cylindrical form, an outer annulus part of said grain being a tube of hydrazine diborane surrounding a concentric cylindrical core of nitronium perchlorate, concentrically spaced rods of hydrazine diborane extending lengthwise through said core; and a thin metal wall about 0.0003 to 0.5 millimeter in thickness separating the nitronium perchlorate core from the hydrazine diborane rods and tube.

2. In the stabilized propellant grain of claim 1, metal wires that conduct heat embedded in the core so that they extend normal to plane surface of the grain which is the igniting end thereof.

3. A stabilized solid propellant grain having a cylindrical form for a rocket, comprising a shaped solid mass of a fuel-rich component and a separate shaped solid mass of an oxidizer-rich component, each of said shaped solid masses being arranged as adjacent parts of the cylindrical grain and extending completely through the grain normal to a surface of the grain exposed for burning, the fuel-rich shaped solid mass containing principally a compound selected from the group consisting of difluoramino-substituted saturated hydrocarbon containing one $NF_2$ group per carbon atom and hydrazine diborane, the oxidizer-rich shaped solid mass component being selected from the group consisting of nitronium perchlorate and hexanitroethane, said separate shaped solid mass of fuel-rich component being separated from the adjacent shaped solid mass of oxidizer-rich component by a thin wall of material about 0.0003 to 0.5 millimeter in thickness to prevent reaction of the fuel-rich component with the oxidizer-rich component before the grain is ignited.

4. A stabilized propellant grain as defined by claim 3, wherein the shaped solid mass of an oxidizer-rich component is nitronium perchlorate and the thin wall of material separating said shaped solid oxidizer-rich component from the shaped solid fuel-rich component is a metal selected from the class consisting of aluminum, magnesium, beryllium and boron.

5. A stabilized propellant grain as defined by claim 3, in which the shaped solid mass of fuel-rich component contains principally difluoramino-substituted saturated hydrocarbon and the shaped solid mass of oxidizer-rich component is hexanitroethane.

6. A stabilized propellant grain for a rocket, said grain being of a perforated cylindrical form comprising a perforated disc-shaped solid oxidizer-rich component and a perforated disc-shaped solid fuel-rich component, said solid oxidizer-rich component being selected from the group consisting of nitronium perchlorate and hexanitroethane, said solid fuel-rich component containing principally hydrazine diborane, said disc of oxidizer-rich component and said disc of fuel-rich component being arranged to give the perforated cylindrical form of the rocket grain with the burning surface in the perforated part of the disc, a thin wall about 0.0003 to 0.5 millimeter in thickness of material which prevents reaction between the solid oxidizer-rich component and the solid fuel-rich component before the grain is ignited being a partitioning wall between the discs, said thin wall extending perpendicularly to the igniting surface through the grain to separate the adjacent disc of solid oxidizer-rich component from the disc of solid fuel-rich component, both completely extending laterally through the grain.

References Cited

UNITED STATES PATENTS

| | | | |
|---|---|---|---|
| 2,408,252 | 9/1946 | De Ganahl | 102—98 X |
| 2,926,613 | 3/1960 | Fox | 102—98 |
| 2,939,275 | 6/1960 | Loedding | 102—98 X |

ROBERT F. STAHL, *Primary Examiner.*

U.S. Cl. X.R.

102—102; 149—22, 36, 42